United States Patent [19]

Kim et al.

[11] Patent Number: 5,633,853

[45] Date of Patent: May 27, 1997

[54] OPTICAL PICKUP WITH TWO OPTICAL SYSTEMS EACH GENERATES A LASER BEAM

[75] Inventors: Yeon O. Kim; Jun H. Park, both of Seoul, Rep. of Korea

[73] Assignee: Daewoo Electronics Co., Ltd., Seoul, Rep. of Korea

[21] Appl. No.: 508,446

[22] Filed: Jul. 28, 1995

[30] Foreign Application Priority Data

Jul. 29, 1994 [KR] Rep. of Korea ................. 94-18672

[51] Int. Cl.⁶ ......................... G11B 17/08; G11B 7/00
[52] U.S. Cl. ................ 369/112; 369/197; 369/265; 369/84
[58] Field of Search ................... 369/84, 86, 112, 369/32, 265, 197

[56] References Cited

U.S. PATENT DOCUMENTS

| | | | |
|---|---|---|---|
| 4,742,508 | 5/1988 | Lee et al. | 369/265 |
| 5,276,669 | 1/1994 | Oohashi et al. | 369/86 |
| 5,414,688 | 5/1995 | Inokuchi | 369/84 |
| 5,420,690 | 5/1995 | Koishi | 369/84 |
| 5,465,244 | 11/1995 | Kobayashi et al. | 369/112 |

*Primary Examiner*—Georgia Y. Epps
*Assistant Examiner*—Kim-Kwok Chu
*Attorney, Agent, or Firm*—Beveride, DeGrandi, Weilacher & Young LLP

[57] ABSTRACT

An optical pickup device for reading a multitude of disks. A first optical system for reading a first optical disk by generating a first laser beam, exposing the first laser beam on the first optical disk and receiving a first reflected light from the first optical disk system, and a second optical system for reading a second optical disk by producing a second laser beam, exposing the second laser beam on the second optical disk and receiving a second reflected light from the second optical disk are provided. Reproduction of the multitude of disks without transporting the pickup device can be formed continuously.

16 Claims, 4 Drawing Sheets

OPTICAL PICKUP WITH TWO OPTICAL SYSTEMS EACH GENERATES A LASER BEAM

BACKGROUND OF THE INVENTION

1. Field of the Invention

The present invention relates to an optical pickup device, and more particularly, to an optical pickup device having a multitude of optical systems in a machine unit, the optical pickup device is applicable to an optical disk reproducing device for reproducing a multitude of optical disks.

2. Description of the Prior Art

In a general optical disk reproducing device for reproducing information recorded in a general information recording medium, a single optical disk driving mechanism is provided so that reproducing for a single optical disk is accomplished. In this optical disk, unit information is recorded on a multitude of tracks and larger amounts of information can be recorded in this kind of optical disk than in the conventional magnetic information recording medium using magnetic characteristics. By utilizing such characteristics of the optical disk, a program for exercising image songs, a movie program, etc. can be applied thereto and information having high quality sound and high resolution can be reproduced.

When the program for exercising the image songs is recorded on an optical disk having an information recording surface and when the information is required to be reproduced continuously, since the reproducing time of the optical disk having an information recording surface is limited, a multitude of optical disk reproducing devices and control units for controlling the operations of the optical disk reproducing devices should be separately provided. In such image song exercising system, during reproducing one optical disk in an optical disk reproducing device, another optical disk to be reproduced is assembled in another optical disk reproducing device. With completion of the reproduction of the first optical disk by the first optical disk reproducing device, the prepared optical disk reproducing device comes to be operated to reproduce the assembled second optical disk.

That is, for operating the image song exercising system continuously using the conventional optical reproducing device having one optical disk deck, at least two optical reproducing devices and at least two separate control units to control the optical reproducing devices are needed. This increases the manufacturing cost of the image song exercising system and occupying space.

Recently, an optical disk having both surfaces as information recording surfaces has been manufactured for recording at least two times the information than that in the optical disk having one information surface. However, an optical pickup device for reading information in the optical disk having two information recording surfaces, should be transported after completing the reproduction of the information recorded in one surface of the optical disk to reproduce the information recorded in the other surface of the optical disk. Accordingly, the mechanism of the transportation of the optical pickup device in the optical disk reproducing device for operating the optical disk having two information recording surfaces is comparatively complicated and the design thereof is not easy.

Recently, research on an optical disk reproducing device including mechanism for driving a multitude of optical disks in one device has attracted much interest. Further, a design for a pickup device which can operate a multitude of optical disks is largely required. For example, in U.S. Pat. No. 4,742,508 (issued to Lee et al.), a system which can selectively drive compact disk or video disk is disclosed. In this system, after reading the information recorded in one disk, the pickup device is transported to read information recorded in the other disk. However, this system also is complicated and continuous reading can not be accomplished due to the transportation of the pickup device.

SUMMARY OF THE INVENTION

In view of the above-mentioned points, an object of the present invention is to provide an optical pickup device having a multitude of optical systems, which is applicable in an optical disk reproducing device designed for working a multitude of optical disks and can advantageously read the information recorded in the multitude of optical disks.

To accomplish the object, there is provided in the present invention an optical pickup device comprising a first optical system for reading a first optical disk by generating a first laser beam, exposing the first laser beam on the first optical disk and receiving a first reflected light from the first optical disk system, and a second optical system for reading a second optical disk by generating a second laser beam, exposing the second laser beam on the second optical disk and receiving a second reflected light from the second optical disk.

According to one embodiment of the present invention, the optical pickup device comprises a receiving device for receiving the reflected lights from the first optical disk and the second optical disk.

In this case, the first optical system comprises: a first light source for generating the first laser beam; a first collimator lens for converting the first laser beam into a parallel light; a first reflecting means for reflecting the parallel light toward an information recording layer of the first optical disk and for reflecting the reflected light from the information recording layer of the first optical disk toward the first collimator lens; and a first object lens for condensing a reflected light toward the information recording layer of the first optical disk by means of the first reflecting means on the first optical disk, and the second optical system comprises: a second light source for generating the second laser beam; a second collimator lens for converting the second laser beam into a parallel light; a second reflecting means for reflecting the parallel light toward an information recording layer of the second optical disk and for reflecting the reflected light from the information recording layer of the second optical disk toward the second collimator lens; and a second object lens for condensing a reflected light toward the information recording layer of the second optical disk by means of the second reflecting means on the second optical disk.

The pickup device may further comprise a first directing means for directing light reflected from and passing through the first collimator lens toward the receiving device, and a second directing means for directing light reflected from and passing through the second collimator lens toward the receiving device. The first and second directing means can be prisms or half mirrors.

Further, as for the first and second reflecting means, prisms, total reflecting mirrors, etc. can be employed.

According to another embodiment of the present invention, the first laser beam and the second laser beam are generated from a light source, and the optical pickup device further comprises a prism for fixing light paths by directing the first laser beam toward the first and second optical disks, and for directing lights from the first and second optical disks toward a first receiving device and a second receiving device.

In this case, the preferred prism is a rhomboid prism having a first reflecting surface for directing the first laser beam toward the first optical disk and for directing light from the first optical device toward the first receiving device, and a second reflecting surface for reflecting a reflected light from the first reflecting surface toward the second optical disk and for directing light from the second optical disk toward the second receiving device.

More preferably, the first optical system comprises: the light source; a first collimator lens for converting the laser beam into a parallel light and for condensing light from the first optical disk; a first reflecting means for reflecting the parallel light directed toward an information recording layer of the first optical disk and for directing the reflected light from the information recording layer of the first optical disk toward the first collimator lens; a first object lens for condensing a reflected light toward the information recording layer of the first optical disk by means of the first reflecting means on the first optical disk; and the first receiving device for receiving light from the first collimator lens, and the second optical system comprises: the light source; a first collimator lens for converting the laser beam into a parallel light; a second reflecting means for reflecting the parallel light directed toward the second optical disk toward an information recording layer of the second optical disk and for directing the reflected light from the information recording layer of the second optical disk toward the second receiving device; a second object lens for condensing a reflected light toward the information recording layer of the second optical disk by means of the second reflecting means on the second optical disk; a second collimator lens for condensing reflected light from the second optical disk; and the second receiving device for receiving light from the second collimator lens.

The optical pickup device may further comprise a directing means for directing light reflected from and passing through the first collimator lens toward the first receiving device. Prism, half mirror, etc. can be used as the directing means.

Further, as for the first and second reflecting means, prisms, total reflecting mirrors, etc. may be employed.

The optical pickup device according to the present invention includes a multitude of optical systems assembled in a machine unit and may be advantageously applied to a reproducing device for a multitude of disks.

According to the optical pickup device of the present invention, optical systems are provided in the optical disk reproducing device for each reproducible optical disk and only a corresponding optical system for the target optical disk for reading is operated.

BRIEF DESCRIPTION OF THE DRAWINGS

The above object and advantages of the present invention will become more apparent by describing in detail a preferred embodiment thereof with reference to the attached drawings, in which.

DESCRIPTION OF THE PREFERRED EMBODIMENT

The present invention will be described in detail referring to the attached drawings.

Figure 1:
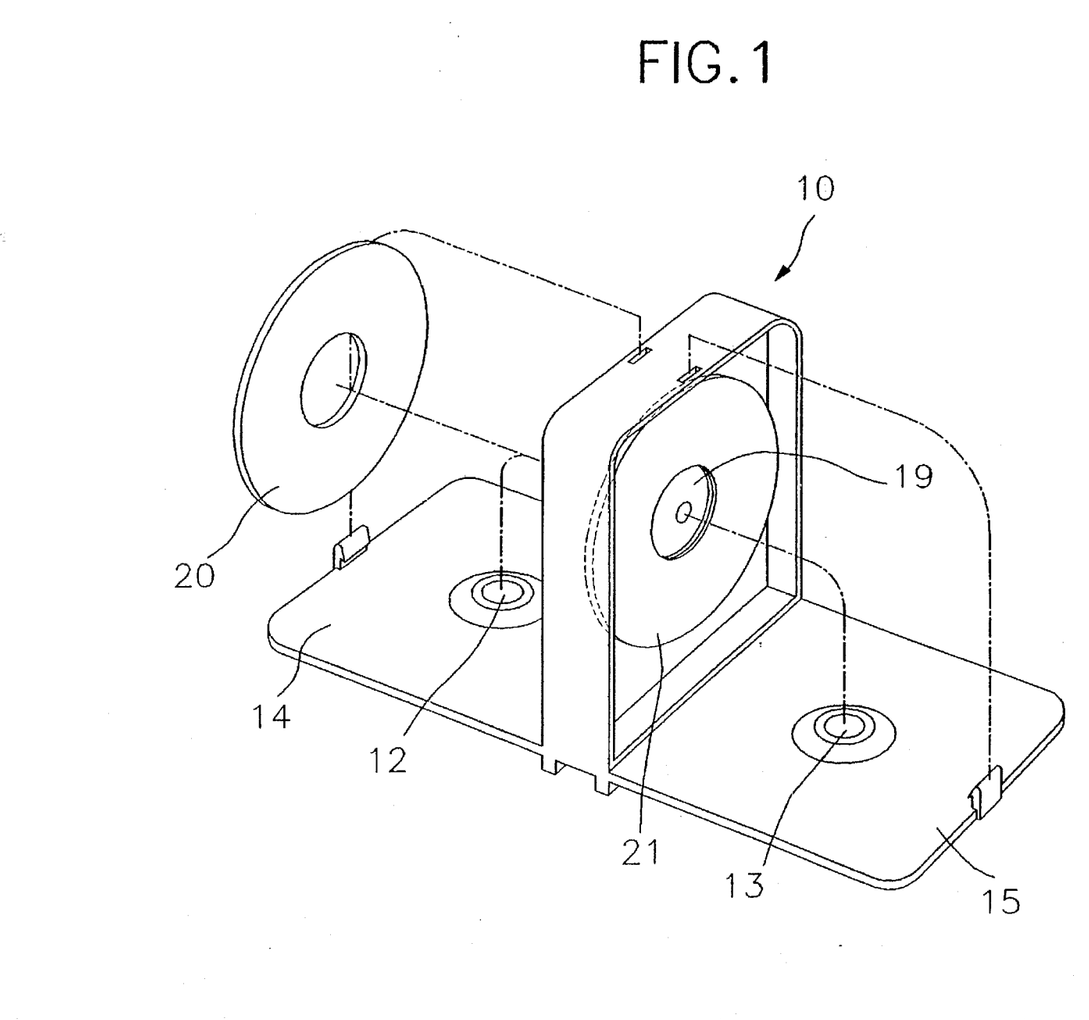
FIG. 1 is a perspective view of an optical disk reproducing device having a mechanism for driving a multitude of optical disks, which employs an optical pickup device for a multitude of optical systems according to one embodiment of the present invention.
Figure 2:
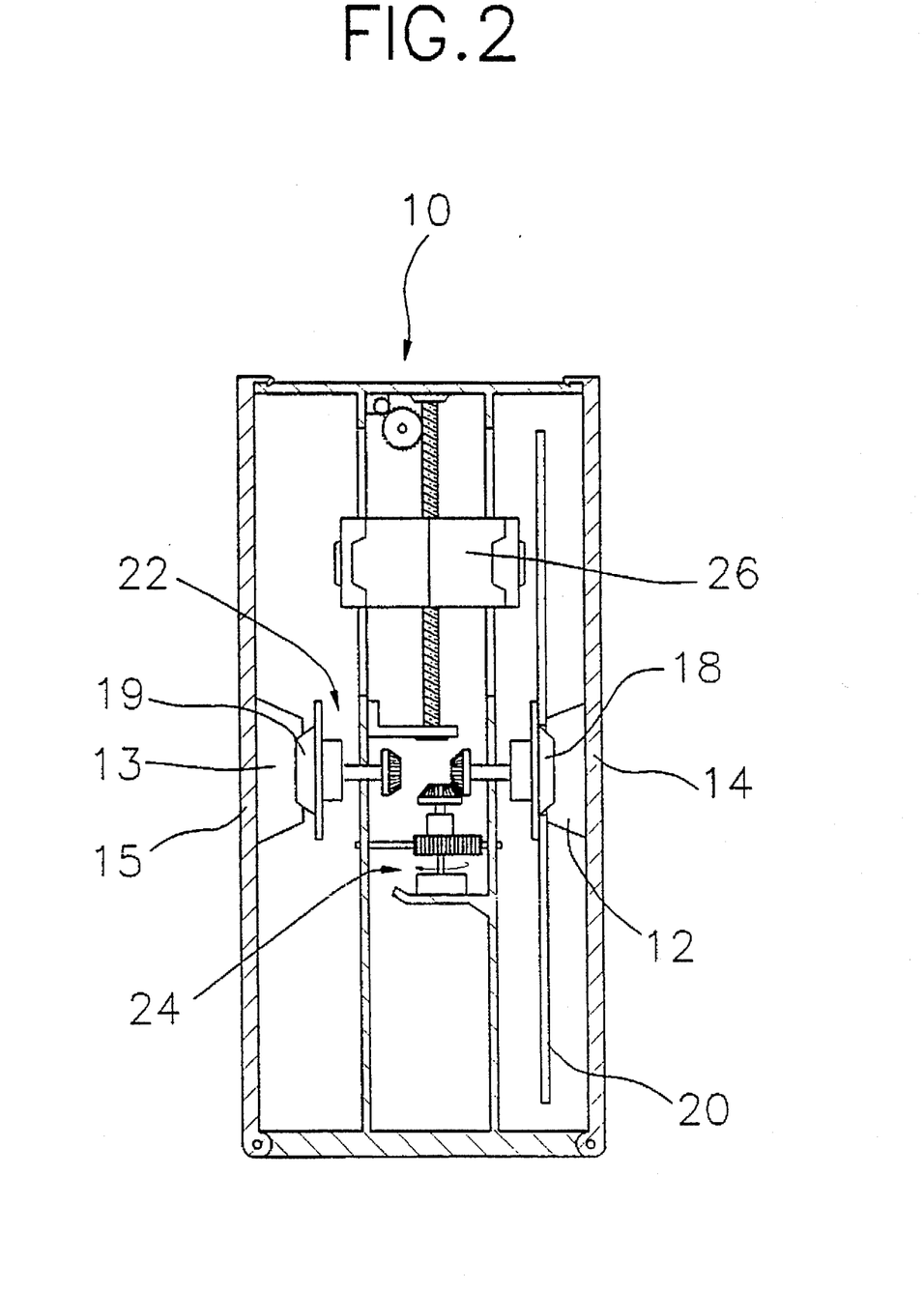
FIG. 2 is a cross-sectional view of the optical disk reproducing device illustrated in FIG. 1 for showing the assembled state of the optical pickup device which can be applied to the optical disk reproducing device in FIG. 1.

In FIGS. 1 and 2, an example of the optical disk reproducing device operating a multitude of optical disks is illustrated. This device has been invented by the present inventors for working two optical disks advantageously. The optical pickup device having a multitude of optical systems according to the present invention can be provided in the above-mentioned optical disk reproducing device.

Referring to FIG. 1, an optical disk reproducing device 10 which is the main body of the device is vertically installed, a first chucking member 12 and a second chucking member 13 are provided at both sides of optical disk reproducing device 10 in the center portion for assembling a first optical disk 20 and a second optical disk 21, and a first side cover 14 and a second side cover 15 of which upper portions can be opened and closed from side to side with the bottom portions thereof as hinge points are provided. A first turntable 18 and a second turntable 19 are provided for assembling first and second optical disks 20 and 21 at the corresponding positions of first and second chucking members 12 and 13 of first and second side covers 14 and 15.

FIG. 2 is a cross-sectional view of the optical disk reproducing device of FIG. 1 when an optical pickup device is installed. Referring to FIG. 2, a spindle assembly 22 movable in its inserted place is provided in hexahedron-type optical disk reproducing device 10 and an operation apparatus 24 which moves from side to side to selectively move spindle assembly 22 according to the on/off of the signal. Further, an optical pickup device 26 for reading the information recorded on the surface of first and second optical disks 20 and 21, while moving along the diameter of optical disks 20 and 21, is mounted.

Figure 3:
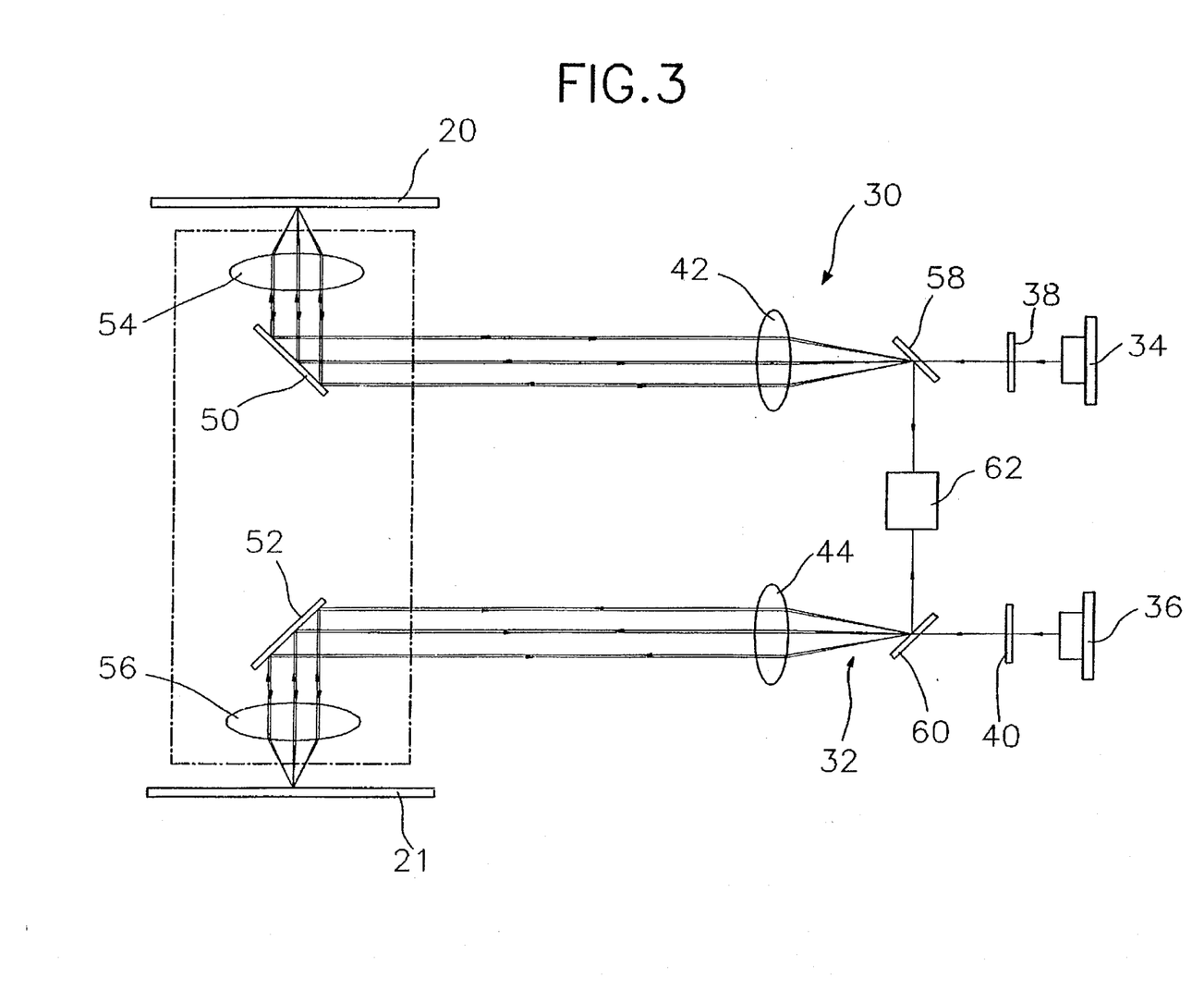
FIG. 3 is a diagram illustrating the elements of the optical pickup device having a multitude of the optical systems according to one embodiment of the present invention.

FIG. 3 is a diagram illustrating the elements of the optical pickup device having a multitude of the optical systems according to one embodiment of the present invention.

The elements in the pickup device will be explained in detail. The pickup device includes a first optical system 30 and a second optical system 32 for emitting laser beams from a first light source 34 and a second light source 36 toward first and second optical disks 20 and 21 installed in the optical disk reproducing device operating a multitude of optical disks as illustrated in FIG. 1, and for obtaining information signals by receiving the reflected lights from first and second optical disks 20 and 21.

First and second optical systems 30 and 32 include corresponding first and second light sources 34 and 36 for generating laser beams to read information recorded on first and second optical disks 20 and 21, a first diffraction grating 38 and a second diffraction grating 40 for separating the laser beams into three beams generated from first and second light sources 34 and 36, a first collimator lens 42 and a second collimator lens 44 for converting the separated beams into parallel beams, a first total reflecting mirror 50 and a second total reflecting mirror 52 for reflecting the parallel beams from first and second collimator lenses 42 and 44 toward a first object lens 54 and a second object lens 56, while reflecting the reflected beams from first and second object lenses 54 and 56 toward a light receiving device, first and second object lenses 54 and 56 for condensing the first and second laser beams from corresponding first and second total reflecting mirrors 50 and 52 toward first and second optical disks 20 and 21. As for the reflection apparatus, a prism also can be used instead of the total reflecting mirror.

Meanwhile, a first directing apparatus 58 and a second directing apparatus 60 for reflecting beams directed toward first and second collimator lenses 42 and 43 by means of first and second reflecting mirrors 50 and 52 and then transmitted through first and second collimator lenses 42 and 44 toward a light receiving device 62, are provided between said first and second diffraction gratings 38 and 40, and first and second collimator lenses 42 and 44.

In this embodiment, a half mirror is used as first and second directing apparatuses 58 and 60. However, a prism can be employed instead of the half mirror.

Further, a single light receiving device 62 is used in this embodiment for receiving reflected lights from first and second directing apparatuses 58 and 60. Light receiving device 62 is operated for both first and second optical systems. This is possible because only the optical system corresponding to the optical disk under reproducing requires being driven. However, a multitude of light receiving devices also can be provided.

When one optical disk is reproduced by the optical pickup device having a multitude of optical systems according to one embodiment of the present invention, a detailed reproducing process under control by a control system (not shown) will be described below.

For first optical disk 20 which is reproduced by the operation of first optical system 30, at first, a first laser beam is generated from first light source 34. The first laser beam is separated into three beams by first diffraction grating 38. The separated laser beams pass through first half mirror 58. Then, these beams are converted into parallel beams by first collimator lens 42. The converted parallel beams are reflected by a first total reflecting mirror 50 toward first optical disk 20 and are condensed by first object lens 54 into a target point on the first optical disk.

The condensed laser beams on first optical disk 20 are reflected again toward first object lens 54 and are converted into parallel beams again. These parallel beams are reflected by first total reflecting mirror 50 toward first collimator lens 42. The condensed beams by first collimator lens 42 are reflected by first half mirror 58 as the first directing apparatus toward light receiving device 62. Electric signal corresponding to the information recorded on first optical disk 20 is outputted from light receiving device 62 according to the common light receiving process.

After completion of the reproducing operation for first optical disk 20, the reproducing operation for second optical disk 21 is carried out by the control of control system and information reading process for the second optical disk is carried out utilizing second optical system 32 as in first optical system 30.

That is, after completion of the first optical disk, the second optical disk can be continuously reproduced without transporting the optical pickup device.

Figure 4:
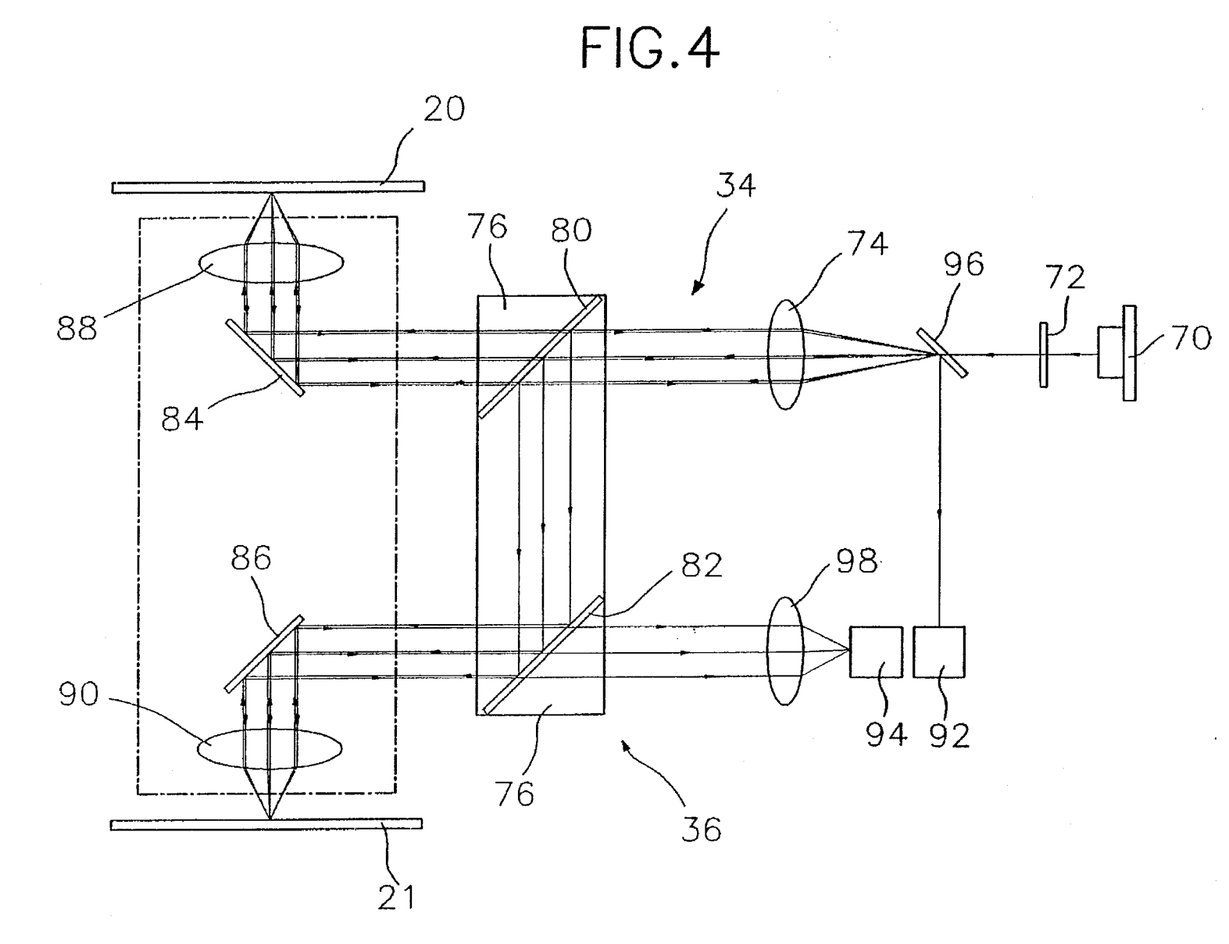
FIG. 4 is a diagram for illustrating the elements of the optical pickup device having a multitude of the optical systems according to another embodiment of the present invention.

FIG. 4 is a diagram for illustrating the elements of the optical pickup device having a multitude of the optical systems according to another embodiment of the present invention. The constituting elements will be described in detail.

This optical pickup device includes a first optical system 34 and a second optical system 36 for radiating laser beam from a light source 70 toward first and second optical disks 20 and 21 which can be assembled in the optical disk reproducing device as illustrated in FIG. 1, and for receiving reflected lights from first and second optical disks 20 and 21 to obtain information signals.

First and second optical systems 34 and 36 have a light source 70 for generating a first and a second laser beams for reading information recorded on first and second optical disks 20 and 21, a diffraction grating 72 for separating the first and second laser beams generated from light source 70 into three beams, a first collimator lens 74 for converting the separated first and second laser beams by diffraction grating 72 into parallel beams, a prism, such as a rhomboid prism 76 for directing the parallel beams from first collimator lens 74 toward corresponding first optical disk 20 or second optical disk 21, a first total reflecting mirror 84 as a first reflecting apparatus for reflecting the parallel beams from prism 76 toward first object lens 88 and for reflecting beams from first object lens 88 toward prism 76, a first object lens for condensing the first laser beam directed from first total reflecting mirror 84 on corresponding first optical disk 20, a first light receiving device 92 for receiving light from first collimator lens 74, a second total reflecting mirror as a second reflecting apparatus for reflecting beams from prism 76 toward second optical disk 21 and for reflecting reflected beams from a second object lens 90 toward second light receiving device 94, second object lens 90 for condensing the second laser beam directed from second total reflecting mirror 86 on corresponding second optical disk, a second collimator lens 98 for condensing parallel light directed from second optical disk 21 and transmitted through prism 70, and a second light receiving device 94 for receiving light from second collimator lens 98.

Further, a half mirror 96 is formed as a directing apparatus for reflecting light directed from first total reflecting mirror 84 toward first collimator lens 74 and transmitted first collimator lens 74, toward first light receiving device 92. A prism also can be used as the directing apparatus.

Prism 76 includes a first reflecting surface 80 for partially transmitting parallel beam from first collimator lens 74 toward first optical disk 20 and for partially reflecting downwards, and a second reflecting surface 82 for totally reflecting the second laser beam reflected from first reflecting surface 80 toward second optical disk 21. First reflecting surface 80 transmits beams directed from first optical disk 20 toward first collimator lens 74, and second reflecting surface transmits beam directed from second optical disk 21 toward second collimator lens 98. In this embodiment, the total reflecting mirror is employed as first and second reflecting apparatuses. However, a prism can be used instead of the total reflecting mirror as in the first embodiment.

According to this embodiment, first and second light receiving devices 92 and 94 are provided to obtain signals of the information from corresponding first and second optical disks 20 and 21. For first light receiving device 92, half mirror 96 as the directing apparatus for directing the reflected beam from first optical disk 20 is provided between first diffraction grating 72 and first collimator lens 74. Meanwhile, for second light receiving device 94, second collimator lens 98 for condensing the reflected light from second optical disk 21 on second light receiving device 94 is provided in front of second light receiving device 94.

For the optical pickup device having a multitude of optical systems according to this embodiment, detailed reproducing process under control by a control system (not shown) will be described below.

First, reproduction of first optical disk 20 utilizing first optical system 34 will be explained. The first laser beam is generated from light source 70 under control of the control system and the first laser beam is separated into three beams by diffraction grating 72. The separated beams are converted into parallel beams by first collimator lens 74. The parallel beams are partially transmitted and partially reflected to second reflecting surface 82 by first reflecting surface 80 formed in prism 76. At this time, the first laser beam (comprised of the parallel beams) can totally pass through first reflecting surface 80. The first laser beam transmitted from first reflecting surface 80 is reflected again by first total reflecting mirror 84 toward first optical disk 20. The reflected beam is condensed by first object lens 88 on the target point of first optical disk 20. The reflected beam from first optical disk 20 passes through first object lens 88 again to be converted into parallel beam. This parallel beam is reflected by first total reflecting mirror 84 toward prism 70 and is transmitted through first reflecting surface 80 in prism 76. The transmitted beam is condensed again by first collimator lens 74 and is reflected by half mirror 96. The reflected beam is received by first receiving device 96 to obtain electric signal of the information. The desired information can be read out by treating the electric signal under control of the control system.

Now, the reproduction of second optical disk 21 utilizing second optical system 36 will be explained.

A second laser beam is generated from light source 70 and is separated into three beams by diffraction grating 72. The separated beams incident into first collimator lens 74 are converted into parallel beams. The parallel beams are partially transmitted and partially reflected toward second reflecting surface 82 by first reflecting surface 80 formed in prism 76. At this time, the second laser beam (comprised of the parallel beams) can be totally reflected at first reflecting surface 80. The reflected beam from first reflecting surface 80 is reflected again at second reflecting surface 82 toward second total reflecting mirror 86. Then, this beam is reflected by second reflecting mirror 86 toward second optical disk 21. This reflected beam is condensed by second object lens 90 on the target point of second optical disk 21. The reflected beam from second optical disk 21 is converted into parallel beam by transmitting second object lens 90. This parallel beam is reflected by second total reflecting mirror 86 toward prism 76 and transmits second reflecting surface 82. This transmitted beam is condensed on second collimator lens 98 and incident into second light receiving device 94. The electric signal of the information recorded on corresponding second optical disk 21 is obtained.

The first laser beam and the second laser beam may have the same wavelength. In this case, reading on first optical disk 20 or second optical disk 21 can be performed selectively by selectively turning on/off first light receiving device 92 and second light receiving device 94.

Of course, the first laser beam and the second laser beam can have different wavelengths. In this case, first reflecting surface 80 selectively transmits or reflects the laser beams according to the wavelength and drives first optical system 34 or second optical system 36, selectively. Accordingly, first optical disk 20 and second optical disk 21 can be selectively read out.

As described above, by employing the optical pickup device having a multitude of optical systems according to the present invention, reading out information recorded on a multitude of optical disks without transporting the optical pickup device can be accomplished continuously. This can be advantageously used as a remarkable optical pickup device for reproducing a multitude of optical disks.

While the present invention is described in detail referring to the attached embodiments, various modifications, alternate constructions and equivalents may be employed without departing from the true spirit and scope of the present invention.

What is claimed is:

1. An optical pickup device comprising:

a first light source for generating a first laser beam into a first direction;

a first half mirror for transmitting said first laser beam into said first direction, and for reflecting light incident from a second direction which is opposite to said first direction into a third direction;

a first collimator lens for converting said first laser beam transmitted through said first half mirror into a first parallel light, and for condensing light incident from said second direction to be directed to said first half mirror in said second direction;

a first total reflecting mirror for reflecting said first parallel light toward a first optical disk, and for directing a first reflecting light from said first optical disk toward said first collimator lens in said second direction;

a first object lens for condensing a second reflecting light reflected from said first total reflecting mirror, and for converting said first reflecting light from said first optical disk into a second parallel light;

a second light source for generating a second laser beam into said first direction;

a second half mirror for transmitting said second laser beam into said first direction, and for reflecting light incident from said second direction which is opposite to said first direction into a fourth direction;

a second collimator lens for converting said second laser beam transmitted from said second half mirror into a third parallel light, and for condensing light incident from said second direction to be directed to said second half mirror in said second direction;

a second total reflecting mirror for reflecting said third parallel light toward a second optical disk, and for directing a third reflecting light from said second optical disk toward said second collimator lens in said second direction;

a second object lens for condensing a fourth reflecting light reflected from said second total reflecting mirror, and for converting said third reflecting light from said second optical disk into a fourth parallel light; and a light receiving device for receiving lights reflected from said first and second half mirrors in said third direction and in said fourth direction, respectively.

2. The optical pickup device of claim 1, further comprising a first and a second diffraction gratings for separating said first and second laser beams into three beams between said first and second light sources and said first and second half mirrors, respectively.

3. An optical pickup device comprising:

a first optical system for reading a first optical disk by generating a first laser beam, illuminating said first laser beam on said first optical disk and receiving a first reflected light from said first optical disk; and a second optical system for reading a second optical disk by producing a second laser beam, illuminating said second laser beam on said second optical disk and receiving a second reflected light from said second optical disk, wherein said optical pickup device comprises a light receiving device for receiving said first and second reflected lights from said first optical disk and said second optical disk, said first optical system comprises:
  a first light source for generating said first laser beam;
  a first collimator lens for converting said first laser beam into a parallel light;
  a first reflecting means for reflecting said parallel light toward an information recording layer of said first optical disk and for reflecting said reflected light from said information recording layer of said first optical disk toward said first collimator lens; and
  a first object lens for condensing a reflected light toward said information recording layer of said first optical disk by means of said first reflecting means on said first optical disk, and said second optical system comprises:
  a second light source for generating said second laser beam;
  a second collimator lens for converting said second laser beam into a parallel light;
  a second reflecting means for reflecting said parallel light toward an information recording layer of said second optical disk and for reflecting said reflected light from said information recording layer of said second optical disk toward said second collimator lens; and
  a second object lens for condensing a reflected light toward said information recording layer of said second optical disk by means of said second reflecting means on said second optical disk.

4. The optical pickup device of claim 3, further comprising a first directing means for directing light reflected from and passed through said first collimator lens toward said light receiving device, and a second directing means for directing light reflected from and passed through said second collimator lens toward said light receiving device.

5. The optical pickup device of claim 4, wherein said first and second directing means are prisms or half mirrors.

6. The optical pickup device of claim 3, wherein said first and second reflecting means are prisms or total reflecting mirrors.

7. The optical pickup device of claim 3, wherein said first laser beam and said second laser beam are generated from a light source, and said optical pickup device further comprises a prism for fixing light paths by directing said first laser beam and said second laser beam toward said first and second optical disks, respectively, and for directing lights from said first and second optical disks toward a first light receiving device and a second light receiving device.

8. The optical pickup device of claim 7, wherein said prism is a rhomboid prism having a first reflecting surface for directing said first laser beam toward said first optical disk and for directing directed light from said first optical disk toward said first light receiving device, and a second reflecting surface for reflecting light reflected from said first reflecting surface toward said second optical disk and for directing directed light from said second optical disk toward said second light receiving device.

9. The optical pickup device of claim 7, wherein said first optical system comprises:
  said light source;
  a first collimator lens for converting said laser beam into a parallel light and for condensing light from said first optical disk;
  a first reflecting means for reflecting said parallel light directed toward said first optical disk toward an information recording layer of said first optical disk and for directing said parallel light reflected from said information recording layer of said first optical disk toward said first collimator lens;
  a first object lens for condensing said parallel light toward said information recording layer of said first optical disk reflected by means of said first reflecting means on said first optical disk; and
  said first light receiving device for receiving light from said first collimator lens, and said second optical system comprises:
  said light source;
  a second collimator lens for converting said laser beam into a parallel light and for condensing light from said second optical disk;
  a second reflecting means for reflecting said parallel light directed toward said second optical disk toward an information recording layer of said second optical disk and for directing said reflected light from said information recording layer of said second optical disk toward said second receiving device;
  a second object lens for condensing said parallel light toward said information recording layer of said second optical disk reflected by means of said second reflecting means on said second optical disk; and
  said second light receiving device for receiving light from said second collimator lens.

10. The optical pickup device of claim 9, further comprising a directing means for directing light reflected from and passed through said first collimator lens toward said first receiving device.

11. The optical pickup device of claim 10, wherein said directing means is prism or half mirror.

12. The optical pickup device of claim 9, wherein said first and second reflecting means are prisms or total reflecting mirrors.

13. An optical pickup device comprising:
  a light source for generating a first and a second laser beams into a first direction for reading a first and a second optical disks, respectively;
  a half mirror for transmitting said first and second laser beams into said first direction, and for reflecting incident light in a second direction which is opposite to said first direction into a third direction;
  a first collimator lens for converting said first and second laser beams transmitted through said half mirror into a first and a second parallel lights, and for condensing incident light in said second direction to be directed to said half mirror in said second direction;
  a rhomboid prism including a first reflecting surface for transmitting said first parallel light into said first direction, for reflecting said second parallel light into a fourth direction and for transmitting incident light from said second direction, and a second reflecting surface for reflecting said second parallel light in said fourth direction toward a fifth direction which is parallel to said first direction and for transmitting incident light in a sixth direction which is opposite to said fifth direction;
  a first total reflecting mirror for reflecting said first parallel light toward said first optical disk, and for reflecting a first reflecting light from said first optical disk toward said rhomboid prism in said second direction;

a first object lens for condensing a second reflecting light reflected from said first total reflecting mirror, and for converting said first reflecting light from said first optical disk into a third parallel light;

a first light receiving device for receiving reflected light from said half mirror into said third direction;

a second total reflecting mirror for reflecting said second parallel light reflected in said fifth direction toward said second optical disk, and for directing a third reflecting light reflected from said second optical disk toward said rhomboid prism in said sixth direction;

a second object lens for condensing a fourth reflecting light reflected from said second total reflecting mirror, and for converting said third reflecting light from said second optical disk into a fourth parallel light;

a second collimator lens for condensing light reflected from said second total reflecting mirror, transmitted through said rhomboid prism and incident in said sixth direction; and a second light receiving device for receiving light condensed by said second collimator lens.

14. The optical pickup device of claim 13, wherein said first laser beam and said second laser beam have different wavelengths, and a first reflecting surface is provided in said rhomboid prism for selectively transmitting or totally reflecting said first and second laser beams according to said wavelengths.

15. The optical pickup device of claim 13, further comprising a diffraction grating for separating said first and second laser beams into three beams between said light source and said half mirror.

16. The optical pickup device of claim 13, wherein said first laser beam and said second laser beam have the same wavelength.

* * * * *